(12) United States Patent
Yoshizawa et al.

(10) Patent No.: US 10,924,021 B2
(45) Date of Patent: Feb. 16, 2021

(54) CONTROL APPARATUS FOR CONTROLLING SWITCHING POWER SUPPLY

(71) Applicant: FUJI ELECTRIC CO., LTD., Kawasaki (JP)

(72) Inventors: Tsuyoshi Yoshizawa, Matsumoto (JP); Jian Chen, Matsumoto (JP)

(73) Assignee: FUJI ELECTRIC CO., LTD., Kawasaki (JP)

( * ) Notice: Subject to any disclaimer, the term of this patent is extended or adjusted under 35 U.S.C. 154(b) by 0 days.

(21) Appl. No.: 16/553,877

(22) Filed: Aug. 28, 2019

(65) Prior Publication Data

US 2020/0106363 A1 Apr. 2, 2020

(30) Foreign Application Priority Data

Oct. 2, 2018 (JP) .................................. 2018-187435
Jan. 15, 2019 (JP) .................................. 2019-004420

(51) Int. Cl.
*H02M 3/335* (2006.01)
*H02M 1/00* (2006.01)

(52) U.S. Cl.
CPC .............. *H02M 3/33507* (2013.01); *H02M 2001/0009* (2013.01)

(58) Field of Classification Search
CPC ..... H02M 3/33507; H02M 2001/0009; H02M 2001/0058; H02M 1/08; H02M 3/335–42; Y02B 70/16

(Continued)

(56) References Cited

U.S. PATENT DOCUMENTS 6,542,387 B2 * 4/2003 Tsuge .................. H02M 3/3385
                                        363/21.01
2012/0163039 A1 * 6/2012 Halberstadt ......... H02M 3/3376
                                        363/21.02

(Continued)

FOREIGN PATENT DOCUMENTS

JP    2014-060895 A    4/2014
JP    2016-111758 A    6/2016

(Continued)

OTHER PUBLICATIONS

"AN11801 TEA19161 and TEA19162 controller ICs Application note", NXP Semiconductors, May 5, 2017.

*Primary Examiner* — Peter M Novak
(74) *Attorney, Agent, or Firm* — Rabin & Berdo, P.C.

(57) ABSTRACT

An apparatus for controlling a switching power supply during burst control that includes a switching period and a no switching period. The switching power supply includes first and second switching elements and a resonance circuit. The control apparatus includes a load detecting circuit that shunts and averages a resonance current of the resonance circuit, an off signal generating circuit that generates off signals for turning off the first and second switching elements during the switching period, an on signal generating circuit that obtains a number of resonance cycles of the ringing voltage in the no switching period and generates a first pulse on signal for turning on the second switching element to restart the switching period, and a control circuit that receives the off signals and the first pulse on signal, and generates first and second control signals for alternating on-off control of the first and second switching elements.

16 Claims, 11 Drawing Sheets

(58) Field of Classification Search
USPC ............ 363/16–17, 21.02, 98, 21.01, 95, 97
See application file for complete search history.

(56) References Cited

U.S. PATENT DOCUMENTS

| | | | |
|---|---|---|---|
| 2016/0164425 A1 | 6/2016 | Chen | |
| 2016/0294298 A1* | 10/2016 | Wong | H02M 3/33592 |
| 2017/0110974 A1* | 4/2017 | Chen | H02M 1/08 |
| 2017/0237356 A1* | 8/2017 | Chen | H02M 3/33553 |
| | | | 363/21.02 |
| 2017/0373604 A1 | 12/2017 | Chen | |
| 2020/0106366 A1* | 4/2020 | Miletic | H03K 17/063 |

FOREIGN PATENT DOCUMENTS

| | | |
|---|---|---|
| JP | 2017-229209 A | 12/2017 |
| WO | 2016/117230 A1 | 7/2016 |

\* cited by examiner

CONTROL APPARATUS FOR CONTROLLING SWITCHING POWER SUPPLY

CROSS-REFERENCE TO RELATED APPLICATIONS

This application is based upon and claims the benefits of priority of the prior Japanese Patent Application No. 2018-187435, filed on Oct. 2, 2018, and the Japanese Patent Application No. 2019-004420, filed on Jan. 15, 2019, the entire contents of which are incorporated herein by reference.

BACKGROUND OF THE INVENTION

1. Field of the Invention

The embodiments discussed herein are related to a control apparatus for controlling a switching power supply that includes a current resonance-type direct current to direct current (DC-DC) switching converter and is capable of burst control that achieves high efficiency during a light load and also suppresses noise.

2. Background of the Related Art

Current resonance-type DC-DC switching converters achieve high efficiency and are capable of being miniaturized, which has resulted in widespread use in power adaptors for TVs and other devices, light emitting diode (LED) light fittings, and the like.

During a standby state where the connected electrical appliance is not in use, the switching power supply of a current resonance-type DC-DC switching converter typically performs burst control where switching operations are intermittently stopped (see, for example, Japanese Laid-open Patent Publication No. 2017-229209). Since burst control includes a no switching period, there is a large reduction in the average standby power during the standby state of the switching power supply.

During burst control, the burst frequency, which is calculated with a switching period in which switching operations are performed and a no switching period in which switching operations are halted as one cycle, may fall within the audible frequency band of 20 Hertz (Hz) to 20 kHz. When this happens, a current of 20 Hz to 20 kHz flowing in the transformer causes magnetostrictive noise at the transformer core, resulting in audible noise. However, when the load in the standby state is 1 watt (W) or below, the burst frequency will have a small amplitude at around 100 Hz, which effectively suppresses audible noise to within a tolerated range.

Modern switching power supplies need to achieve high efficiency at light loads (of around 10 to 30 W). When conventional burst control is performed under a light load, the burst frequency is around 1 kHz and the noise at this frequency is unacceptably large.

On the other hand, there is also a technology that sets the burst frequency under a light load at a frequency above 20 kHz to avoid the generation of noise at audible frequencies (see, for example, NXP Semiconductors, "AN11801 TEA 19161 and TEA 19162 controller ICs—Application note", May 5, 2017, NXP Semiconductors, retrieved online on Aug. 1, 2018 at the URL: www.nxp.com/docs/en/application-note/AN11801.pdf). According to "AN11801 TEA19161 and TEA19162 controller ICs—Application note" (page 68, paragraph 9.3.2), the burst frequency under a light load is set at a frequency higher than 23 kHz.

During burst control under a light load, switching operations are halted by turning off the high-side and low-side switching elements during a no switching period. A resonance circuit formed by a resonant capacitor and an excitation inductor is connected to a node connected to both the high-side and low-side switching elements. This resonance circuit is a closed circuit due to the stray capacitance between the node and ground. This means that during the no switching period in the burst cycle (in FIG. 46 on page 69, the "wait period" after the dump pulse in the half bridge HB waveform), the resonance circuit will resonate at the ringing frequency.

According to the burst control disclosed in "AN11801 TEA19161 and TEA19162 controller ICs—Application note", although the length of the no switching period is decided according to the output power, that is, the feedback voltage, the timing at which the no switching period actually ends is the timing at which the ringing waveform corresponding to the output power reaches a peak. This is because it is efficient to turn on the high-side switching element when the ringing waveform reaches a peak.

Here, since the number of resonance cycles of the ringing during the no switching period is an integer, the number of resonance cycles corresponding to a certain output power may be two adjacent discrete numbers (see "AN11801 TEA19161 and TEA19162 controller ICs—Application note" page 70, paragraph 9.3.2.3). When different numbers of resonance cycles coexist in this way, the burst frequency loses continuity and becomes unstable. The coexistence of different numbers of resonance cycles results in a plurality of overlapping waveforms, and even when the respective periods of the different numbers of resonance cycles do not fall within the audible range, a component in the audible range may still result from a Fourier transform, leading to situations where the tolerated range for noise is exceeded.

SUMMARY OF THE INVENTION

According to an aspect, there is provided a control apparatus for controlling a switching power supply during burst control that includes a switching period and a no switching period, the switching power supply including a half bridge circuit having a first switching element on a high side and a second switching element on a low side, and a resonance circuit connected to the half bridge circuit, the resonance circuit generating a resonance current and a ringing voltage, the control apparatus including: a load detecting circuit that outputs a load signal by shunting and averaging the resonance current of the resonance circuit; an off signal generating circuit that generates a plurality of off signals for turning off the first switching element and the second switching element during the switching period; an on signal generating circuit that obtains a number of resonance cycles of the ringing voltage in the no switching period, and generates a first pulse on signal for turning on the second switching element to restart the switching period; and a control circuit that receives the off signals generated by the off signal generating circuit and the first pulse on signal generated by the on signal generating circuit, and generates a first control signal and a second control signal for alternating on-off control of the first switching element and the second switching element.

The object and advantages of the invention will be realized and attained by means of the elements and combinations particularly pointed out in the claims.

It is to be understood that both the foregoing general description and the following detailed description are exemplary and explanatory and are not restrictive of the invention.

DETAILED DESCRIPTION OF THE INVENTION

Figure 1:
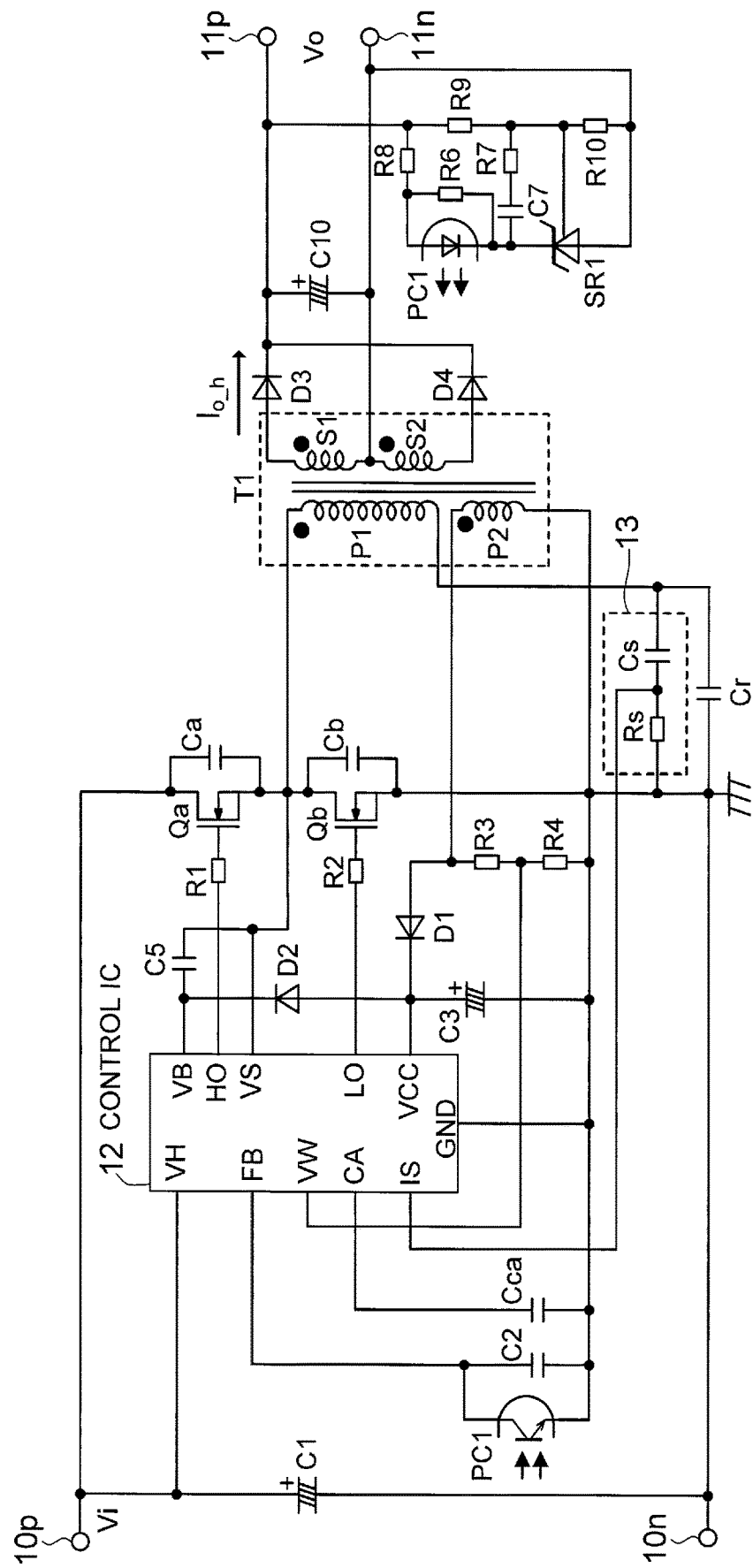
FIG. 1 is a circuit diagram depicting a switching power supply equipped with a control apparatus according to a first embodiment.

Several embodiments will be described below with reference to the accompanying drawings. Note that parts denoted by the same reference numerals in the drawings indicate the same component elements. In the following description also, the same character strings may be used both for the names of terminals of component elements and voltages, signals, and the like at these terminals.

Figure 2:
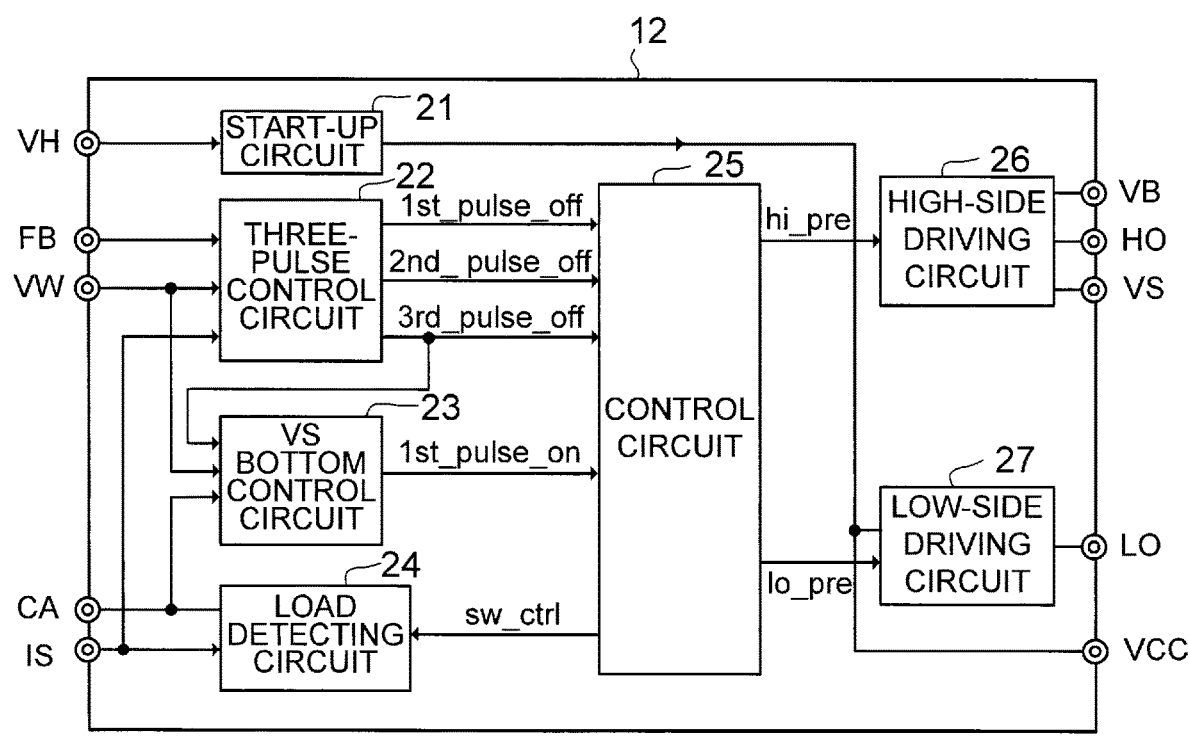
FIG. 2 is a functional block diagram depicting an example configuration of a control IC as the control apparatus according to the first embodiment.

FIG. 1 is a circuit diagram depicting a switching power supply equipped with a control apparatus according to a first embodiment. FIG. 2 is a functional block diagram depicting an example configuration of a control IC as a control apparatus according to the first embodiment.

The switching power supply depicted in FIG. 1 includes input terminals 10p and 10n to which a direct current (DC) input voltage Vi is applied. As one example, the DC input voltage Vi is a high voltage that is constant and is generated by a power factor correction circuit. An input capacitor C1 and a half bridge circuit, which includes a series circuit formed by a high-side switching element Qa and a low-side switching element Qb, are connected in parallel to the input terminals 10p and 10n. In the illustrated example, N-channel metal-oxide-semiconductor field-effect transistors (MOSFETs) are used as the switching elements Qa and Qb. The capacitances Ca and Cb respectively connected in parallel to the switching elements Qa and Qb indicate the stray capacitances between the respective drains and sources of the switching elements Qa and Qb.

A connection point between the switching elements Qa and Qb is connected to one terminal of a primary winding P1 of a transformer T1, and another terminal of the primary winding P1 is connected via a resonant capacitor Cr to ground. A resonance circuit is formed by the resonant capacitor Cr and a resonant reactor which uses a leakage inductance that is increased by reducing the coupling coefficient between the primary winding P1 and secondary windings S1 and S2 of the transformer T1. Note that instead of using the leakage inductance, it is also possible to connect an inductor in series, which is separate to the inductance that forms the transformer T1, to the resonant capacitor Cr and use the inductance of this inductor to produce a resonant reactor for forming the resonance circuit.

One terminal of the secondary winding S1 of the transformer T1 is connected to an anode terminal of a diode D3 and one terminal of the secondary winding S2 is connected to an anode terminal of a diode D4. Cathode terminals of the diodes D3 and D4 are connected to a positive electrode terminal of an output capacitor C10 and an output terminal 11p. A negative electrode terminal of the output capacitor C10 is connected to a connection point between the secondary windings S1 and S2 and to an output terminal 11n. The secondary windings S1 and S2, the diodes D3 and D4, and the output capacitor C10 form a circuit that rectifies and smooths an alternating current (AC) voltage induced in the secondary windings S1 and S2 to convert the voltage to a DC voltage, which corresponds to an output circuit of the switching power supply.

A positive electrode terminal of the output capacitor C10 is connected via a resistor R8 to an anode terminal of a light-emitting diode of a photocoupler PC1 and a cathode terminal of the light-emitting diode is connected to a cathode terminal of a shunt regulator SR1. A resistor R6 is connected in parallel to the anode terminal and cathode terminal of the light-emitting diode. An anode terminal of the shunt regulator SR1 is connected to the output terminal 11n. The shunt regulator SR1 has a reference terminal that is connected to a connection point between resistors R9 and R10 that are connected in series between the positive electrode terminal and the negative electrode terminal of the output capacitor C10. A series circuit formed by a resistor R7 and a capacitor C7 is connected to the reference terminal and the cathode terminal of the shunt regulator SR1. The shunt regulator SR1 passes a current in keeping with a difference between a potential produced by dividing the output voltage Vo (that is, the voltage across both ends of the output capacitor C10) and an internal reference voltage (which corresponds to a target voltage for the output voltage) to the light-emitting diode. A collector terminal of the phototransistor in the photocoupler PC1 is connected to an FB terminal of the control IC 12, an emitter terminal is connected to ground, and a capacitor C2 is connected in parallel to the collector terminal and the emitter terminal.

The control IC 12 has a VH terminal that is connected to the positive electrode terminal of the input capacitor C1 and a GND terminal that is connected to ground. The control IC 12 also has an HO terminal that is connected via a resistor R1 to a gate terminal of the high-side switching element Qa and an LO terminal that is connected via a resistor R2 to a gate terminal of the low-side switching element Qb. The control IC 12 is further equipped with a VB terminal, a VS terminal, a CA terminal, an IS terminal, and a VCC terminal. A bootstrap capacitor C5 is connected between the VB terminal and the VS terminal and the VS terminal is connected to a connection point between the switching elements Qa and Qb. One terminal of a capacitor Cca is connected to the CA terminal and the other terminal of the capacitor Cca is connected to ground. The IS terminal is connected to a connection point between a capacitor Cs and a resistor Rs which form a series circuit connected in parallel to the resonant capacitor Cr. The VCC terminal is connected to a positive electrode terminal of a capacitor C3 and a negative electrode terminal of the capacitor C3 is connected to ground. The VCC terminal is also connected to an anode terminal of a bootstrap diode D2 and a cathode terminal of a bootstrap diode D2 is connected to the VB terminal. The VCC terminal is additionally connected to a cathode terminal of a diode D1, an anode terminal of the diode D1 is connected to one terminal of an auxiliary winding P2 of the transformer T1, and another terminal of the auxiliary winding P2 is connected to ground. The auxiliary winding P2 is also connected in parallel to a series circuit formed by resistors R3 and R4, and the connection point between the resistors R3 and R4 is connected to the VW terminal of the control IC 12.

The series circuit formed by the capacitor Cs and the resistor Rs that is connected in parallel to the resonant capacitor Cr corresponds to a shunt circuit 13 that shunts the resonance current. The current shunted by the shunt circuit 13 is converted to a voltage signal by the resistor Rs, which is provided for current detection, and is inputted into the IS terminal of the control IC 12. The resonance currents that flow through the resonant capacitor Cr and the capacitor Cs have effectively the same waveform and a maximum amplitude that is decided by the ratio between the capacitances of the resonant capacitor Cr and the capacitor Cs. When the capacitance of the capacitor Cs is smaller than the capacitance of the resonant capacitor Cr, only an exceedingly small current flows to the resistor Rs provided for current detection, so that the power consumed in current detection is suppressed to a negligible level.

As depicted in FIG. 2, the control IC 12 includes a start-up circuit 21, a three-pulse control circuit (or "off signal generating circuit") 22, a VS bottom control circuit (or "on signal generating circuit") 23, a load detecting circuit 24, a control circuit 25, a high-side driving circuit 26, and a low-side driving circuit 27.

An input terminal of the start-up circuit 21 is connected to the VH terminal and an output terminal of the start-up circuit 21 is connected to the low-side driving circuit 27 and the VCC terminal. Input terminals of the three-pulse control circuit 22 are connected to the FB terminal, the VW terminal, and the IS terminal. The three-pulse control circuit 22 has output terminals for a first pulse off signal 1st_pulse_off, a second pulse off signal 2nd_pulse_off, and a third pulse off signal 3rd_pulse_off, which are connected to input terminals of the control circuit 25. The third pulse off signal output terminal of the three-pulse control circuit 22 is connected to an input terminal of the VS bottom control circuit 23. Other input terminals of the VS bottom control circuit 23 are connected to the VW terminal and the CA terminal, and an output terminal of the VS bottom control circuit 23 is connected to an input terminal of a first pulse on signal 1st_pulse_on of the control circuit 25. Input terminals of the load detecting circuit 24 are respectively connected to the IS terminal and an output terminal of a signal sw_ctrl of the control circuit 25, and an output terminal of the load detecting circuit 24 is connected to the CA terminal.

An output terminal of a high-side output signal hi_pre of the control circuit 25 is connected to an input terminal of the high-side driving circuit 26 and an output terminal of a low side output signal lo_pre of the control circuit 25 is connected to an input terminal of the low-side driving circuit 27. An output terminal of the high-side driving circuit 26 is connected to the HO terminal and an output terminal of the low-side driving circuit 27 is connected to the LO terminal. The high-side driving circuit 26 is also connected to the VB terminal, which is provided as the high-side power supply, and the VS terminal, which is used as the high-side reference potential.

The start-up circuit 21 converts the DC input voltage Vi at the start-up of the switching power supply to a power supply voltage of the control IC 12, supplies the power supply voltage to the VCC terminal to charge the capacitor C3, and stops operating after start-up ends. Note that after start-up ends, the control IC 12 is powered by a DC voltage produced by the diode D1 and the capacitor C3 converting the AC voltage induced in the auxiliary winding P2 of the transformer T1.

Next, specific examples of the three-pulse control circuit 22, the VS bottom control circuit 23, the load detecting circuit 24, and the control circuit 25 of the control IC 12 will be described.

Figure 3:
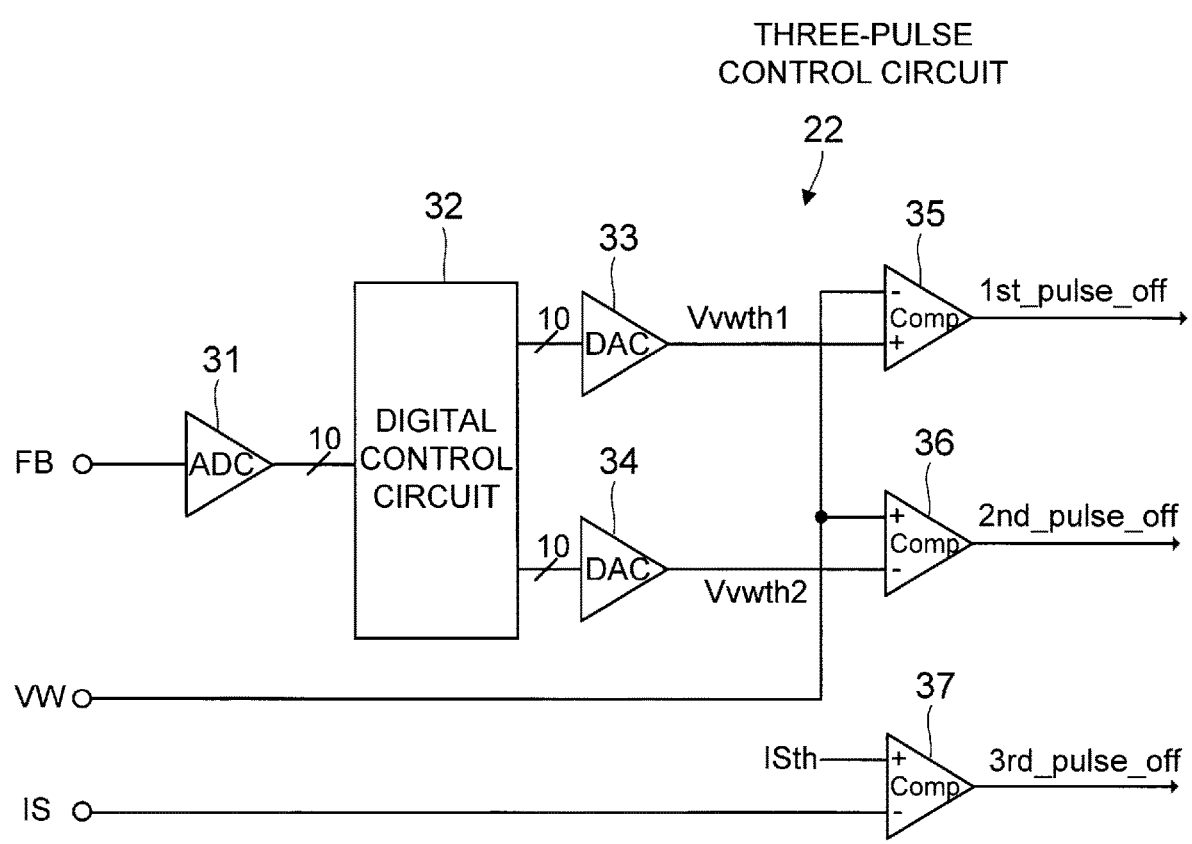
FIG. 3 is a circuit diagram depicting an example configuration of a three-pulse control circuit.
Figure 4:
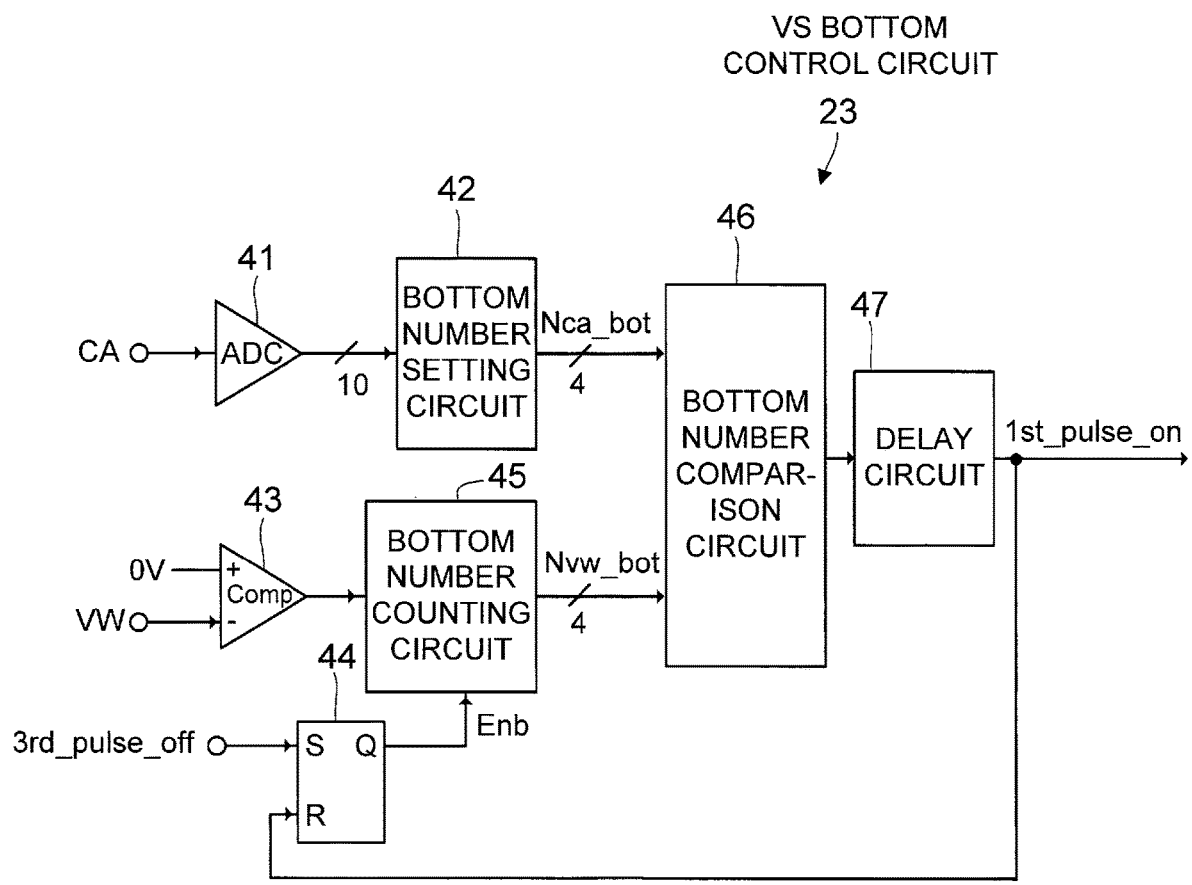
FIG. 4 is a circuit diagram depicting an example configuration of a VS bottom control circuit.
Figure 5:
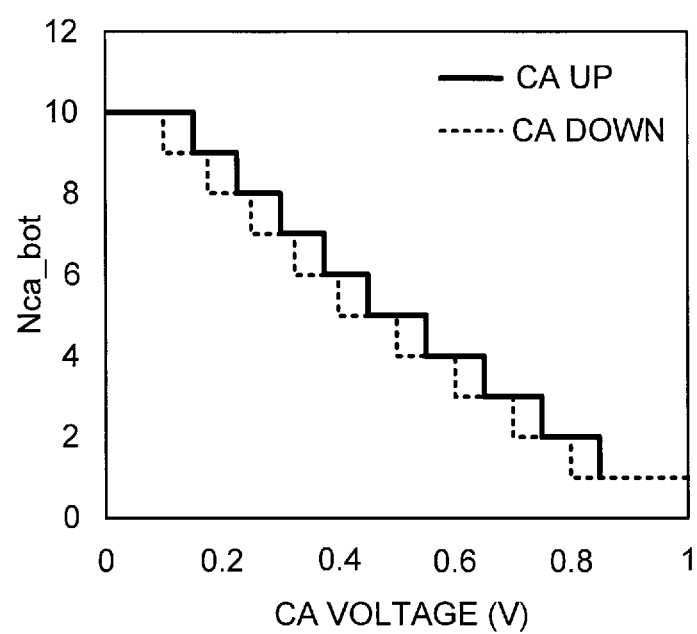
FIG. 5 depicts the relationship between a set bottom number and a CA voltage.
Figure 6:
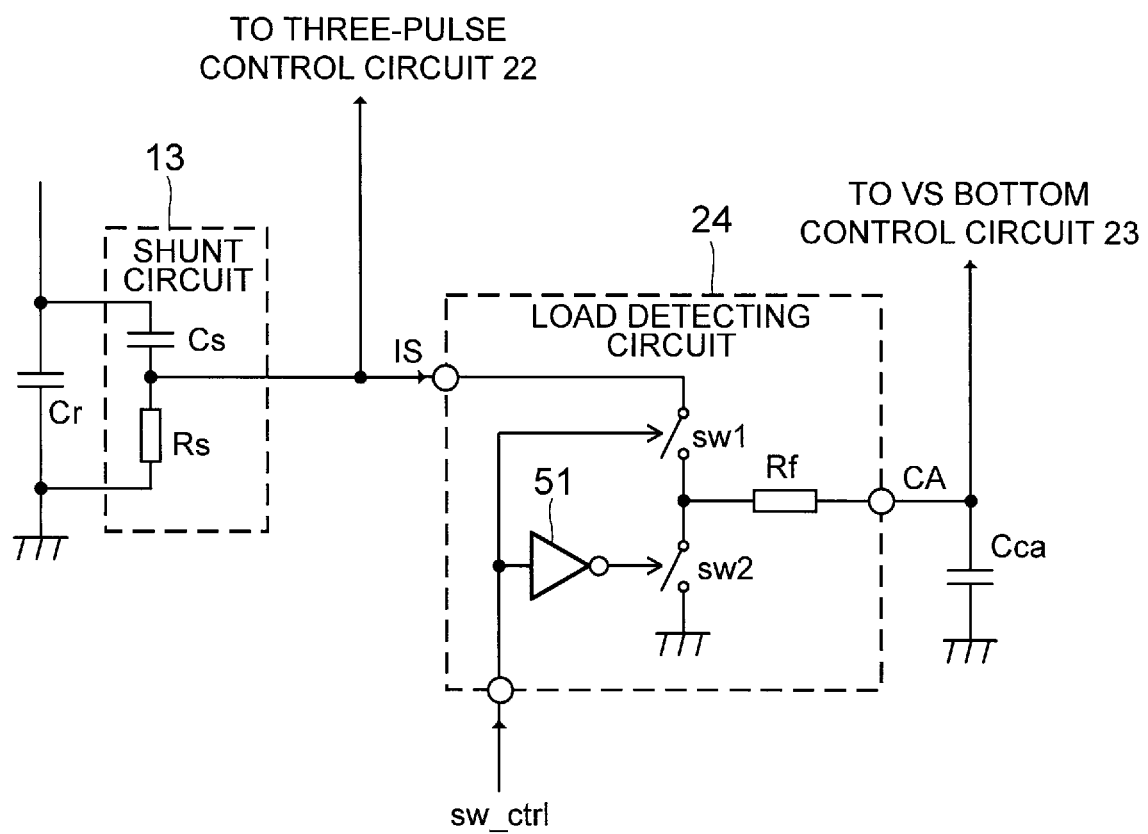
FIG. 6 is a circuit diagram depicting an example configuration of a load detecting circuit.
Figure 7:
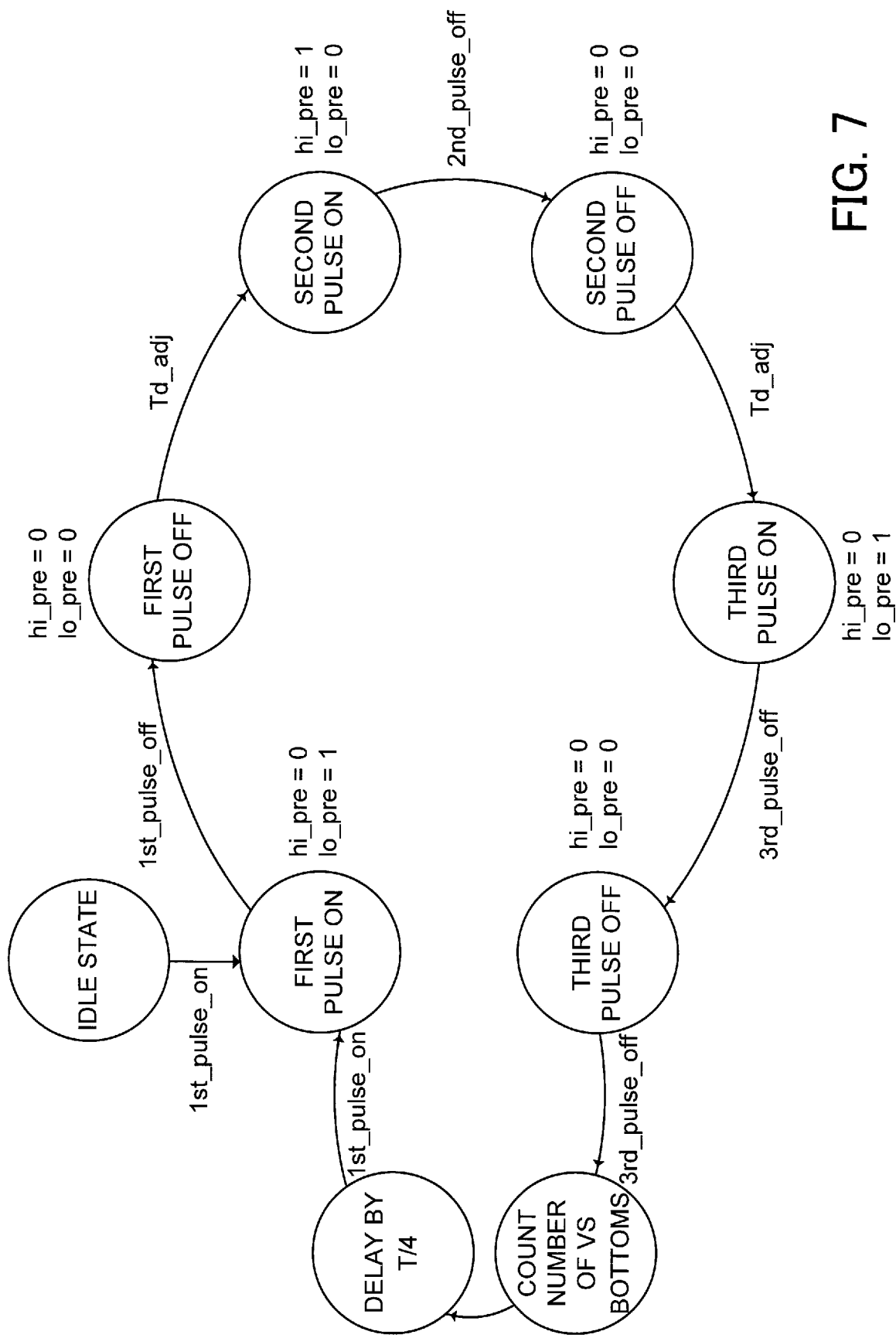
FIG. 7 is a state transition diagram depicting operations of a control circuit and the VS bottom control circuit.
Figure 8:
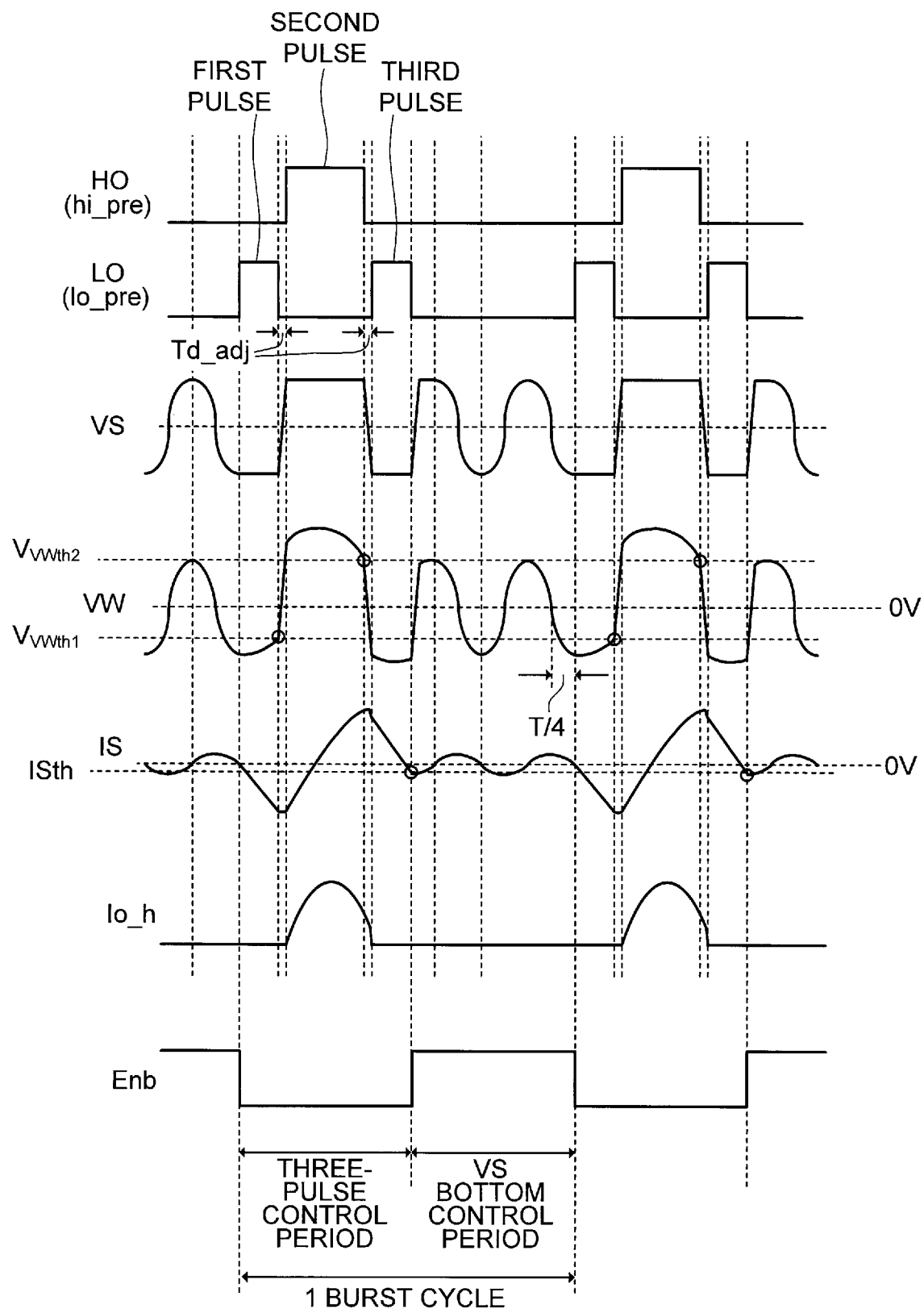
FIG. 8 is a timing chart for burst operation.

FIG. 3 is a circuit diagram depicting an example configuration of the three-pulse control circuit, FIG. 4 is a circuit diagram depicting an example configuration of the VS bottom control circuit, FIG. 5 depicts the relationship between a set bottom number and a CA voltage, FIG. 6 is a circuit diagram depicting an example configuration of the load detecting circuit, FIG. 7 is a state transition diagram depicting the operations of the control circuit and the VS bottom control circuit, and FIG. 8 is a timing chart for burst operation.

As depicted in FIG. 3, the three-pulse control circuit 22 includes an analog-to-digital converter 31, a digital control circuit 32, digital-to-analog converters 33 and 34, and comparators 35, 36, and 37, and forms an off signal generating circuit.

An input terminal of the analog-to-digital converter 31 is connected to the FB terminal of the control IC 12 and an output terminal of the analog-to-digital converter 31 is connected to the digital control circuit 32. Note that the FB terminal is pulled up to a high potential by a pull-up resistor, not illustrated, inside the control IC 12 to become a voltage of an equivalent value to the output voltage Vo. The digital control circuit 32 has two output terminals which are respectively connected to input terminals of the digital-to-analog converters 33 and 34. An output terminal of the digital-to-analog converter 33 is connected to a non-inverting input terminal of the comparator 35 and an output terminal of the digital-to-analog converter 34 is connected to an inverting input terminal of the comparator 36. An inverting input terminal of the comparator 35 and a non-inverting input terminal of the comparator 36 are connected to the VW terminal of the control IC 12. An inverting input terminal of the comparator 37 is connected to the IS terminal of the control IC 12. An IS threshold voltage ISth is applied to a non-inverting input terminal of the comparator 37. Output terminals of the comparators 35, 36, and 37 are connected to input terminals of the control circuit 25. Note that the analog-to-digital converter 31, the digital control circuit 32, and the digital-to-analog converters 33 and 34 form a threshold voltage generating circuit.

In the three-pulse control circuit 22, the analog-to-digital converter 31 converts the feedback voltage inputted into the FB terminal to a 10-bit digital signal and the digital control circuit 32 outputs two 10-bit digital signals that are set in accordance with the feedback voltage. As one example, to adjust the power that reaches the secondary side of the transformer T1 from the primary side in keeping with the size of the load, the digital control circuit 32 sets the two outputted digital signal values so that the difference between the values falls as the inputted feedback voltage increases. The digital-to-analog converters 33 and 34 convert the digital signals outputted by the digital control circuit 32 to the analog VW threshold voltages Vvwth1 and Vvwth2 which are outputted. The comparator 35 compares the VW voltage (or "winding voltage") applied to the VW terminal of the control IC 12 with the VW threshold voltage Vvwth1. When the first pulse is on and the VW voltage is higher than the VW threshold voltage Vvwth1, the comparator 35 outputs the first pulse off signal 1st_pulse_off. The comparator 36 compares the VW voltage applied to the VW terminal of the control IC 12 with the VW threshold voltage Vvwth2. When the second pulse is on and the VW voltage is lower than the VW threshold voltage Vvwth2, the comparator 36 outputs the second pulse off signal 2nd_pulse_off. The comparator 37 compares the IS voltage applied to the IS terminal of the control IC 12 with the IS threshold voltage ISth. When the third pulse is on and the IS voltage has fallen to the IS threshold voltage ISth, the comparator 37 outputs the third pulse off signal 3rd_pulse_off.

In this way, the three-pulse control circuit 22 controls the timing for turning off the first pulse, the second pulse, and the third pulse, which are generated in a switching period (or "three-pulse control period") during burst control under a low load. That is, the first pulse is a signal that turns on the switching element Qb to generate an excitation current and produce a state where the resonance circuit is capable of resonating during the following second pulse. The first pulse is turned off at timing where the VW voltage becomes higher than the VW threshold voltage Vvwth1. The second pulse is a signal that turns on the switching element Qa to cause power to reach the secondary side of the transformer T1. The second pulse is turned off at timing where the VW voltage becomes lower than the VW threshold voltage Vvwth2. The third pulse is a signal that turns on the switching element Qb to cause excitation energy to accumulate in the capacitor Cr. The third pulse is turned off at timing where the IS voltage falls to the IS threshold voltage ISth.

As depicted in FIG. 4, the VS bottom control circuit 23 includes an analog-to-digital converter 41, a bottom number setting circuit 42, a comparator 43, an RS flip-flop 44, a bottom number counting circuit 45, a bottom number comparison circuit 46, and a delay circuit 47, which form an on signal generating circuit for the first pulse.

An input terminal of the analog-to-digital converter 41 is connected to the CA terminal of the control IC 12 and an output terminal of the analog-to-digital converter 41 is connected to an input terminal of the bottom number setting circuit 42. An output terminal of the bottom number setting circuit 42 is connected to one input terminal of the bottom number comparison circuit 46. An inverting input terminal of the comparator 43 is connected to the VW terminal of the control IC 12. A voltage of zero volts is applied to a non-inverting input terminal of the comparator 43. An output terminal of the comparator 43 is connected to an input terminal of the bottom number counting circuit 45. A set input terminal of the RS flip-flop 44 is connected to the output terminal of the comparator 37 of the three-pulse control circuit 22 and an output terminal of the RS flip-flop 44 is connected to an enable terminal of the bottom number counting circuit 45. An output terminal of the bottom number counting circuit 45 is connected to another input terminal of the bottom number comparison circuit 46. An output terminal of the bottom number comparison circuit 46 is connected to an input terminal of the delay circuit 47 and an output terminal of the delay circuit 47 is connected to an input terminal of the control circuit 25 and also to a reset input terminal of the RS flip-flop 44.

In the VS bottom control circuit 23, the analog-to-digital converter 41 converts the voltage of the capacitor Cca, which is connected to the CA terminal, to a 10-bit digital signal. The bottom number setting circuit sets the length of the no switching period (or "VS bottom control period") during burst control under a light load in accordance with the voltage of the CA terminal (or "load signal"). As depicted in FIG. 5, the bottom number setting circuit 42 outputs a set bottom number Nca_bot corresponding to the CA voltage. The set bottom number Nca_bot has a value that differs when the CA voltage rises and falls. By providing hysteresis in the setting of the set bottom number Nca_bot, the ringing frequency that appears in the no switching period is prevented from frequently changing within a short time. As one example, the set bottom number Nca_bot is expressed by a 4-bit digital signal. The set bottom number Nca_bot corresponds to the no switching period during the burst control.

The bottom number counting circuit 45 counts the number of bottoms in the ringing voltage appearing in the no switching period and outputs the counted bottom number Nvw_bot as a 4-bit digital signal. The no switching period is a period from when the third pulse is turned off to when the first pulse of the next burst cycle is turned on. Accordingly, when the RS flip-flop 44 has been set in response to the third pulse off signal 3rd_pulse_off and has outputted the enable signal Enb, the bottom number counting circuit 45 starts counting the number of bottoms in the ringing voltage. When the RS flip-flop 44 has been reset in response to the first pulse on signal 1st_pulse_on, the bottom number counting circuit 45 stops counting the number of bottoms in the ringing voltage. Although the ringing voltage is generated by a resonance circuit that includes the primary winding P1 of the transformer T1, a similar voltage waveform also appears in the auxiliary winding P2, and for this reason the VW voltage that is generated in the auxiliary winding P2 and divided by the resistors R3 and R4 is used as the ringing voltage. The comparator 43 compares the VW voltage with 0 V and outputs a high level detection signal when the VW voltage drops below 0 V. The bottom number counting circuit 45 counts the number of times the VW voltage drops below 0 V while the enable signal Enb is being inputted. In this way, the comparator 43 detects the timing at which the VW voltage drops below 0 V, and does not detect bottoms in the VW voltage. This is because it is not possible to directly detect bottoms in the VW voltage. The actual bottoms in the VW voltage appear at timing that is delayed by a quarter period of the ringing cycle T from the timing of a zero cross where the VW voltage drops below 0 V.

The bottom number comparison circuit 46 compares the set bottom number Nca_bot with the counted bottom number Nvw_bot, and outputs a matching signal when the counted bottom number Nvw_bot reaches the set bottom number Nca_bot. Since the matching signal is actually produced when the VW voltage has fallen below 0 V, the matching signal is delayed by T/4 by the delay circuit 47 to become the first pulse on signal 1st_pulse_on of the next burst cycle. Note that the ringing voltage oscillates at a fixed frequency due to a resonance circuit formed by the resonant reactor of the transformer T1, the resonant capacitor Cr, and the capacitances Ca and Cb between the drains and sources of the switching elements Qa and Qb. Thanks to the delay circuit 47, the detection of bottoms in the VW voltage is accurately performed.

The first pulse on signal 1st_pulse_on outputted by the delay circuit 47 is sent to the control circuit 25. This first pulse on signal 1st_pulse_on is sent to the reset terminal of the RS flip-flop 44 to reset the RS flip-flop 44. By doing so, the bottom number counting circuit 45 is disabled and the count number is cleared.

As depicted in FIG. 6, the load detecting circuit 24 has switches sw1 and sw2 connected in series, with one terminal of the switch sw1 connected to the IS terminal of the control IC 12 and one terminal of the switch sw2 connected to the GND terminal of the control IC 12. The IS terminal is connected to the output terminal of the shunt circuit 13 which includes the capacitor Cs and the resistor Rs. The connection point between the switches sw1 and sw2 is connected via a resistor Rf to the CA terminal of the control IC 12. The capacitor Cca is connected to the CA terminal, and the resistor Rf and the capacitor Cca form an averaging circuit that averages the voltage signal at the connection point between the switches sw1 and sw2.

A control terminal of the switch sw1 is connected to a sw_ctrl terminal that receives a signal sw_ctrl from the control circuit 25, and a control terminal of the switch sw2 is connected via the inverter circuit 51 to the sw_ctrl terminal. With this configuration, the load detecting circuit 24 inputs the signal at the IS terminal or a signal at the ground level into the averaging circuit in accordance with the logic level of the signal sw_ctrl. Although the high side output signal hi_pre for driving the high-side switching element Qa is used here as the signal sw_ctrl, during burst control under a light load, this signal is the same as the second pulse. Accordingly, while the high-side switching element Qa is turned on, a voltage proportional to the resonance current is applied to the averaging circuit, and while the high-side switching element Qa is turned off, a ground level voltage is applied to the averaging circuit. In this way, by adding the ground level when the switching element Qa is turned off to the averaging of the averaging circuit, the average value of the input current of the switching power supply, that is, the load state of the switching power supply, is accurately detected and sent to the VS bottom control circuit 23.

The control circuit 25 operates according to the sequence depicted in the state transition diagram in FIG. 7. The operation of the control circuit 25 will now be described with reference to the timing chart depicted in FIG. 8. In FIG. 8, "HO" is the driving signal of the HO terminal and has the same waveform as the high-side output signal hi_pre outputted by the control circuit 25. "LO" is the driving signal of the LO terminal and has the same waveform as the low-side output signal lo_pre outputted by the control circuit 25. "VS" is the VS voltage of the VS terminal, "VW" is the VW voltage of the VW terminal, "IS" is the IS voltage of the IS terminal, "Io_h" is the output current on the secondary side of the transformer T1, and "Enb" is the enable signal Enb inputted into the bottom number counting circuit 45. Note that FIG. 8 does not depict the start of the burst cycle and instead illustrates a situation where burst control is in progress and the set bottom number Nca_bot is set at "2".

When, in an idle state where normal continuous switching operations are being performed, the load falls to a predetermined light load, the control circuit 25 generates the first pulse on signal 1st_pulse_on to enter a three-pulse control period in which switching operations in burst control are started. By doing so, the control circuit 25 turns on the first pulse. At this time, the high-side output signal hi_pre outputted by the control circuit 25 becomes the low level (0), the low-side output signal lo_pre becomes the high level (1), and the low-side switching element Qb is turned on while the high-side switching element Qa remains off. By doing so, the VS terminal becomes the ground potential and the VW voltage reaches the lowest potential.

After this, the VW voltage rises from the lowest potential and when the VW voltage becomes higher than the VW threshold voltage Vvwth1 and the first pulse off signal 1st_pulse_off is received from the three-pulse control circuit 22, the control circuit 25 turns off the first pulse. At this time, the low-side output signal lo_pre outputted by the control circuit 25 becomes the low level (0), so that the switching element Qb is turned off.

After the switching element Qb is turned off, the control circuit 25 performs dead time adjustment (Td_adj) so that the high-side switching element Qa and the low-side switching element Qb are not on at the same time, thereby preventing a through current from flowing.

After performing the dead time adjustment (Td_adj), the control circuit 25 generates the second pulse-on signal 2nd_pulse_on to turn on the second pulse. At this time, the high side output signal hi_pre outputted by the control circuit 25 becomes the high level (1) so that the high side switching element Qa is turned on. By doing so, when the VS terminal becomes the potential of the DC input voltage Vi, the VW voltage becomes a higher potential than the VW threshold voltage Vvwth2. While the high-side switching element Qa is turned on, the IS voltage rises and the output current Io_h flows on the secondary side of the transformer T1.

After this, when the VW voltage falls to the VW threshold voltage Vvwth2 and the second pulse off signal 2nd_pulse_off is received from the three-pulse control circuit 22, the control circuit 25 turns off the second pulse. At this time, the high-side output signal hi_pre outputted by the control circuit 25 becomes the low level (0) and the switching element Qa is turned off.

Next, the control circuit 25 performs dead time adjustment (Td_adj) and then generates the third pulse on signal 3rd_pulse_on. By doing so, the control circuit 25 turns on the third pulse. At this time, the low side output signal lo_pre outputted by the control circuit 25 becomes the high level (1) so that the low-side switching element Qb is turned on. As a result, the IS voltage falls.

When the IS voltage falls to the IS threshold voltage ISth and the third pulse off signal 3rd_pulse_off is received from the three-pulse control circuit 22, the control circuit 25 turns off the third pulse. At this time, the low side output signal lo_pre outputted by the control circuit 25 becomes the low level (0) so that the switching element Qb is turned off.

When the third pulse is turned off, the burst cycle enters a VM bottom control period in which switching operations are stopped. In the VM bottom control period, the VS bottom control circuit 23 that received the third pulse off signal 3rd_pulse_off enables the bottom number counting circuit 45 so as to count the number of VM bottoms. When the counted bottom number Nvw_bot reaches the set bottom number Nca_bot, the delay circuit 47 outputs the first pulse on signal 1st_pulse_on after delaying by a period that is one quarter of the ringing period T from the timing at which the set bottom number Nca_bot was reached.

When the control circuit 25 receives the first pulse on signal 1st_pulse_on, the first pulse is turned on to start the next burst cycle. When the VS bottom control circuit 23 receives the first pulse on signal 1st_pulse_on, the bottom number counting circuit 45 is disabled and the counted bottom number is cleared.

As described above, in the control apparatus of the switching power supply, the VS bottom number (that is, the VS bottom control period) is set in accordance with the size of the load (CA voltage) and the number of resonance cycles of the ringing in the no switching period is controlled based on the set VS bottom number. Under a light load, since the number of resonance cycles is set in advance by a relatively stable CA voltage, the number of resonance cycles is stable without frequently changing, and different numbers of resonance cycles do not coexist. This means that it is possible to achieve both high efficiency through burst control and the suppression of noise through no coexistence of different numbers of resonance cycles.

In the VS bottom control circuit 23 described above, the output voltage may temporarily drop when the load suddenly changes from a light load state to a heavy load state, such as when the load returns from the standby state to the normal state. This happens because control of the bottom number is performed based on the load signal that expresses the load state, that is, the voltage of the CA terminal that has slow response, so that control of the bottom number does not follow sudden changes in load. A control apparatus according to a second embodiment, which is improved so as to reduce the drop in voltage when there is a load surge, will now be described.

Figure 9:
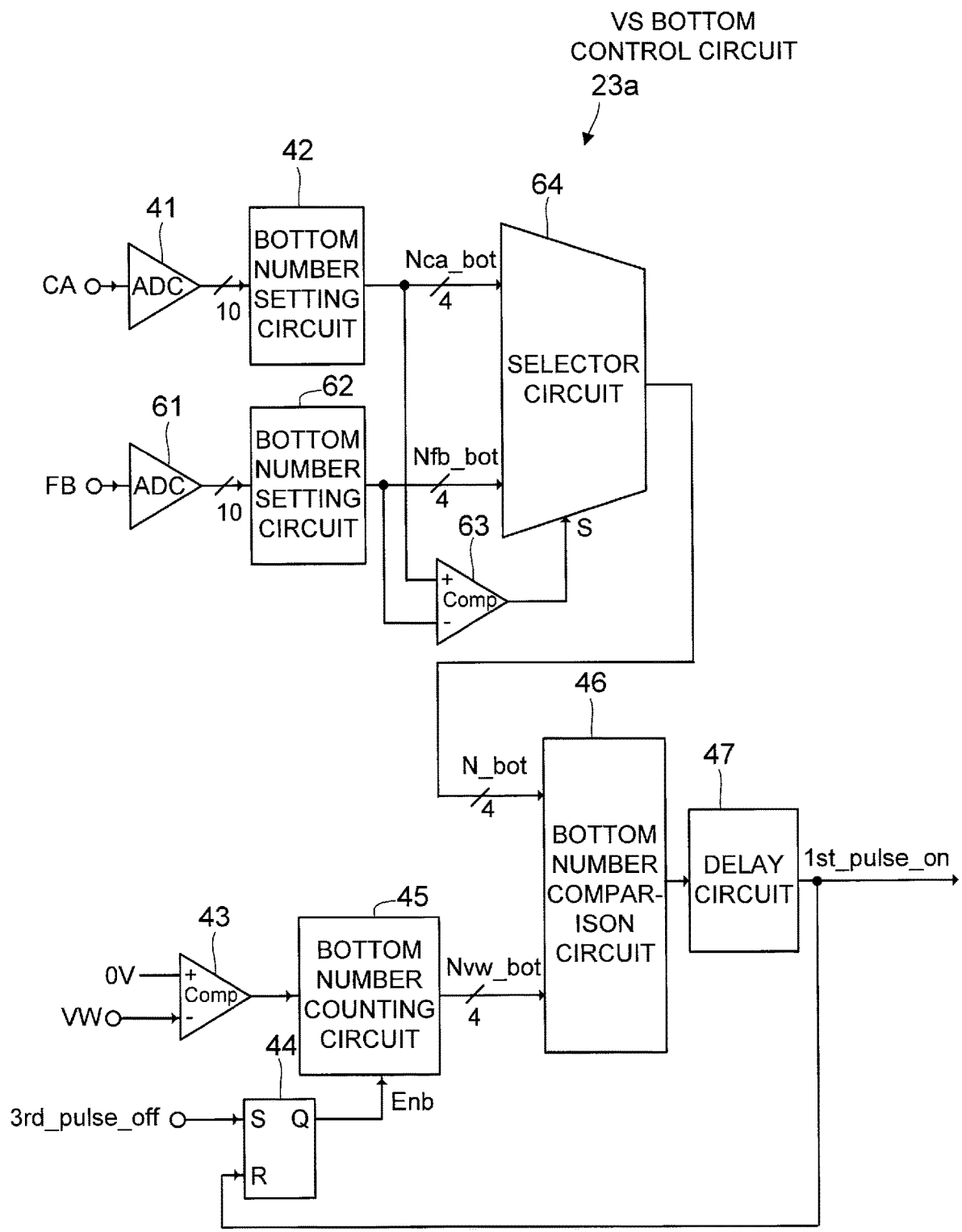
FIG. 9 is a circuit diagram depicting one example configuration of a VS bottom control circuit in a control IC as a control apparatus according to a second embodiment.
Figure 10:
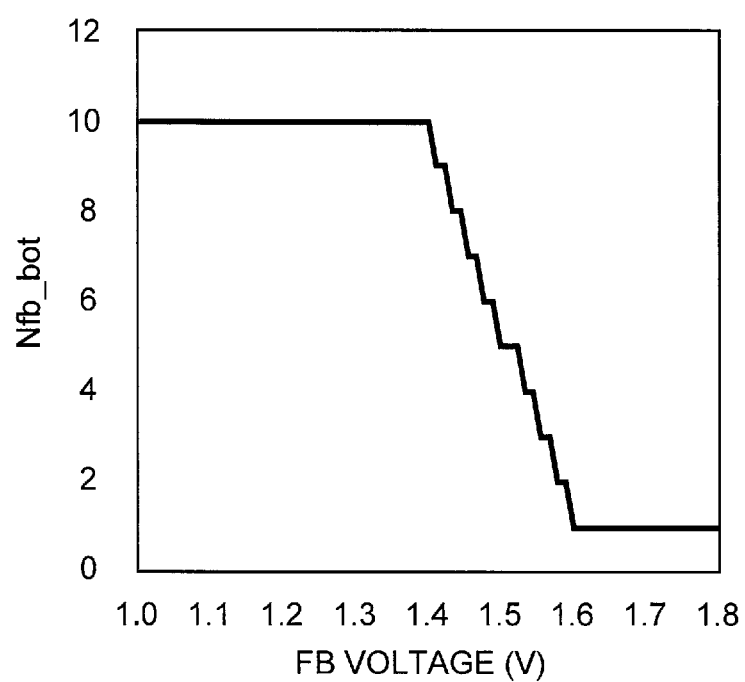
FIG. 10 is a diagram depicting the relationship between a set bottom number and an FB voltage.
Figure 11:
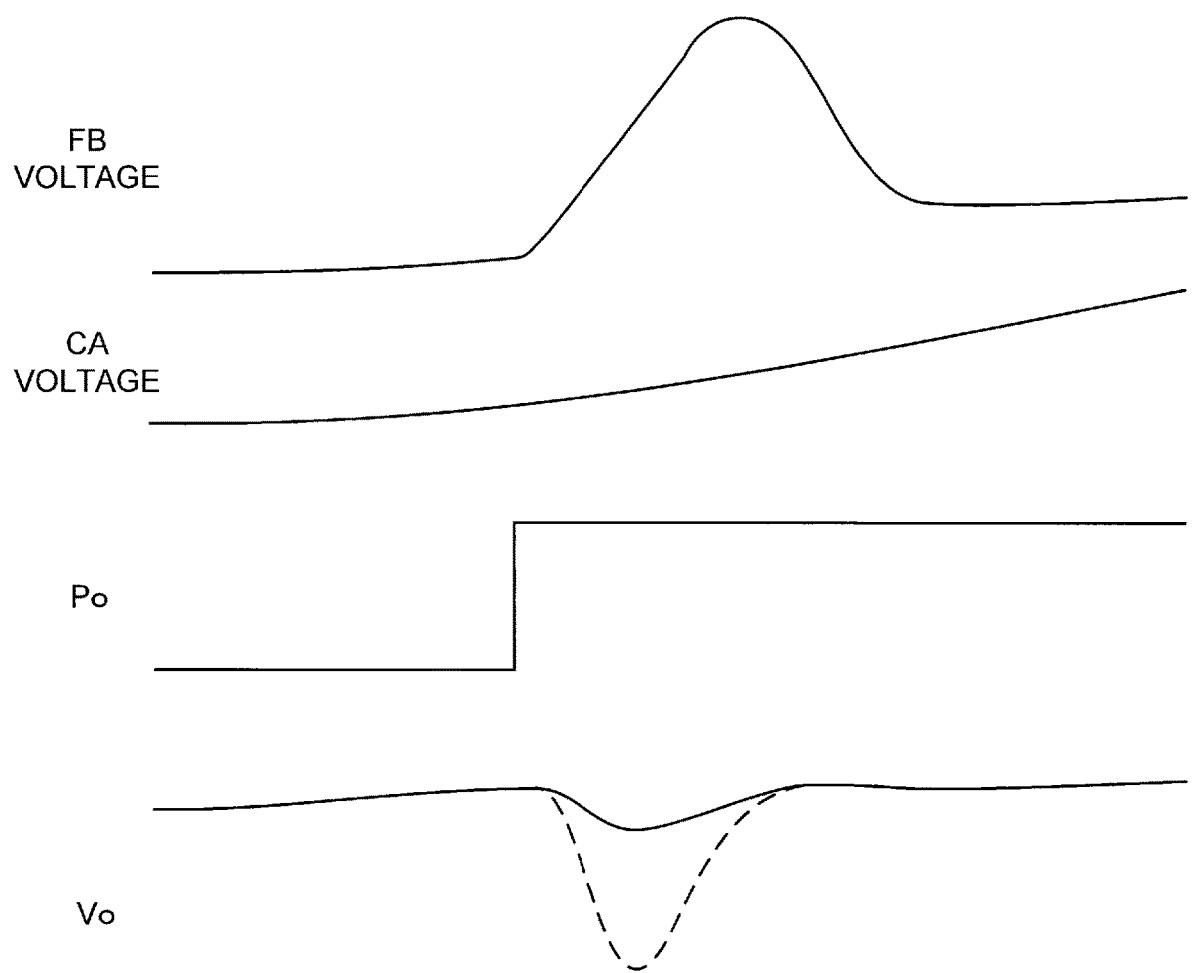
FIG. 11 is a timing chart for when there is a load surge.

FIG. 9 is a circuit diagram depicting one example configuration of a VS bottom control circuit in a control IC as a control apparatus according to a second embodiment. FIG. 10 is a diagram depicting the relationship between the set bottom number and the FB voltage. FIG. 11 is a timing chart for when there is a load surge.

In the second embodiment, the VS bottom control circuit 23 in the control IC 12 according to the first embodiment is changed to a VS bottom control circuit 23a depicted in FIG. 9, but the other component elements of the control IC 12 are the same as in the first embodiment. Accordingly, the configuration and operation of the VS bottom control circuit 23a will be described here. Note that in the VS bottom control circuit 23a depicted in FIG. 9, component elements that are the same as the VS bottom control circuit 23 depicted in FIG. 4 have been assigned the same reference numerals and detailed description has been omitted.

In addition to the configuration of the VS bottom control circuit 23 in FIG. 4, the VS bottom control circuit 23a additionally includes an analog-to-digital converter 61, a bottom number setting circuit 62, a comparator (or "bottom number comparator") 63, and a selector circuit 64.

An output terminal of the analog-to-digital converter 41 whose input terminal is connected to the CA terminal of the control IC 12 is connected to an input terminal of the bottom number setting circuit 42. The output terminal of the bottom number setting circuit 42 is connected to a non-inverting input terminal of the comparator 63 and one input terminal of the selector circuit 64. An input terminal of the analog-to-digital converter 61 is connected to the FB terminal of the control IC 12 and an output terminal of the analog-to-digital converter 61 is connected to an input terminal of the bottom number setting circuit 62. An output terminal of the bottom number setting circuit 62 is connected to an inverting input terminal of the comparator 63 and another input terminal of the selector circuit 64. An output terminal of the comparator 63 is connected to a control terminal S of the selector circuit 64, and an output terminal of the selector circuit 64 is connected to one input terminal of the bottom number comparison circuit 46. As one example, the selector circuit 64 may be a multiplexer that outputs a signal inputted into one input terminal or another input terminal according to the logic state of the control terminal S.

In this VS bottom control circuit 23a, the analog-to-digital converter 41 converts the CA voltage to a 10-bit digital signal and the analog-to-digital converter 61 converts the FB voltage to a 10-bit digital signal. The bottom number setting circuit 42 sets a bottom number (no switching period) in accordance with the CA voltage (load signal) and the bottom number setting circuit 62 sets a bottom number (no switching period) in accordance with the FB voltage (feedback voltage). As one example, the bottom number setting circuit 42 has the input-output characteristics depicted in FIG. 5 and outputs the set bottom number Nca_bot in keeping with the CA voltage. The bottom number setting circuit 62 has the input-output characteristics depicted in FIG. 10 and outputs a set bottom number Nfb_bot in keeping with the FB voltage. As one example, the set bottom number Nca_bot and the set bottom number Nfb_bot are expressed by 4-bit digital signals. Note that the bottom number setting circuits 42 and 62 respectively function as no switching period setting circuits.

According to the example relationship between the set bottom number and the CA voltage depicted in FIG. 5, the bottom number setting circuit 42 outputs a set bottom number Nca_bot that is sequentially rounded to integers in a range of 10 to 1 while the CA voltage changes across a range of 0 to 1 volts. On the other hand, according to the example relationship between the set bottom number and the FB voltage illustrated in FIG. 10, the bottom number setting circuit 62 sets a set bottom number Nfb_bot of 10 when the FB voltage changes in a range of 1.0 to 1.3 volts under a steady load. The bottom number setting circuit 62 also outputs a set bottom number Nfb_bot that suddenly changes in a range of 10 to 1 when the FB voltage changes in a range of 1.4 to 1.6 volts as the load suddenly changes.

The comparator 63 compares the set bottom number Nca_bot with the set bottom number Nfb_bot and determines which of the set bottom number Nca_bot and the set bottom number Nfb_bot is smaller.

In a steady load state, the set bottom number Nca_bot that has a value of "7" for example in the range of 10 to 1 is inputted into the non-inverting input terminal of the comparator 63 and the set bottom number Nfb_bot that has a value of 10 is inputted into the inverting input terminal of the comparator 63. When this happens, since a larger value than the non-inverting input terminal is inputted into the inverting input terminal, the comparator 63 outputs a low level (0) logic signal and this low level (0) logic signal is inputted into the control terminal S of the selector circuit 64. When a logic signal at the low level (0) is inputted into the control terminal S, the selector circuit 64 selects the set bottom number Nca_bot and outputs a 4-bit digital signal as the set bottom number N_bot. That is, the selector circuit 64 selects and outputs the set bottom number Nca_bot that has a smaller value than the set bottom number Nfb_bot. The set bottom number N_bot is inputted into the bottom number comparison circuit 46 as a reference signal for comparison purposes.

When a load surge subsequently occurs, the set bottom number Nca_bot with a value of "7", which is almost the same as during the steady load state, is inputted into the non-inverting input terminal of the comparator 63, but the set bottom number Nfb_bot with a value of "1" is inputted into the inverting input terminal of the comparator 63. When this happens, since the value "7" that is larger than the value of the inverting input terminal is inputted into the non-inverting input terminal of the comparator 63, the comparator 63 outputs a logic signal at the high level (1). The logic signal of the high level (1) is inputted into the control terminal S of the selector circuit 64. When a logic signal at the high level (1) is inputted into the control terminal S, the selector circuit 64 selects and outputs the set bottom number Nfb_bot as the set bottom number N_bot. That is, the selector circuit selects the set bottom number Nfb_bot that has a smaller value than the set bottom number Nca_bot and outputs the selected set bottom number Nfb_bot as the set bottom number N_bot. The set bottom number N_bot is inputted into the bottom number comparison circuit 46 as a reference signal for comparison purposes.

Next, the operation of a switching power supply equipped with the control IC 12 with the VS bottom control circuit 23a of the above configuration will be described with reference to FIG. 11. First, when the load is in the standby state and the switching power supply is subjected to burst control, the output voltage Vo is controlled based on the CA voltage that is stable, so that the FB voltage (feedback voltage) and the output power Po are also in a stable state.

Here, when the load returns from the standby state to the normal state and the output power Po surges, the FB voltage increases in response to the sudden change in the output power Po. Due to this, the relationship between the values of the set bottom number Nca_bot set in accordance with the CA voltage and the set bottom number Nfb_bot set in accordance with the FB voltage is reversed, and the set bottom number Nfb_bot during the VS bottom control period effectively becomes "1". By minimizing the VS bottom control period which is the no switching period, control is made more responsive and the drop in the output voltage Vo is reduced. On the change curve of the output voltage Vo in FIG. 11, the curve indicated by the broken line depicts the case where control is performed using the CA voltage that does not responsively follow the load surge.

As described above, the control apparatus of the switching power supply according to the second embodiment achieves both high efficiency through burst control and suppression of noise by avoiding coexistent of different numbers of resonance cycles, and additionally suppresses a drop in the output voltage when the load surges.

Note that in the second embodiment, the smaller out of a number of resonance cycles (VS bottom number) of the ringing based on the CA voltage and a number of resonance cycles (or VS bottom number) of the ringing based on the FB voltage is used to set the VS bottom control period used in burst control. However, the result of selecting the smaller out of the number of resonance cycles of the ringing based on the CA voltage and the number of resonance cycles of the ringing based on the FB voltage may be used for purposes aside from setting the VS bottom control period during burst control.

Although the series resonance circuit including the resonant reactor and the resonance capacitor Cr is connected in parallel to the low-side switching element Qb in the embodiments described above, the series resonance circuit may be connected in parallel to the high-side switching element Qa.

The control apparatus of the switching power supply of the above configuration limits the number of resonance cycles of the ringing voltage generated in the no switching period of burst control to a number set in advance, so that different numbers of resonance cycles do not coexist. This is advantageous in suppressing noise produced due to the coexistence of different numbers of resonance cycles.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A control apparatus for controlling a switching power supply during burst control that includes a switching period and a no switching period, the switching power supply including
a half bridge circuit having a first switching element on a high side and a second switching element on a low side, and
a resonance circuit connected to the half bridge circuit, the resonance circuit generating a resonance current and a ringing voltage,
the control apparatus comprising:
a load detecting circuit that outputs a load signal by shunting and averaging the resonance current of the resonance circuit;
an off signal generating circuit that generates a plurality of off signals for turning off the first switching element and the second switching element during the switching period;
an on signal generating circuit that obtains a number of resonance cycles of the ringing voltage in the no switching period, and generates a first pulse on signal for turning on the second switching element to restart the switching period; and
a control circuit that receives the plurality of off signals generated by the off signal generating circuit and the first pulse on signal generated by the on signal generating circuit, and generates a first control signal and a second control signal for alternating on-off control of the first switching element and the second switching element, wherein
the resonance circuit includes a resonant reactor that has a transformer with an auxiliary winding, a winding voltage being generated by the auxiliary winding;
the plurality of off signals include a first pulse off signal, a second pulse off signal and a third pulse off signal; and
the off signal generating circuit includes:
a threshold voltage generating circuit that receives a feedback voltage corresponding to a difference between an output voltage of the switching power supply and a target voltage for the output voltage, and generates a first threshold voltage and a second threshold voltage for detecting a change in the winding voltage, the second threshold voltage being higher than the first threshold voltage;
a first comparator that outputs the first pulse off signal upon detecting that the winding voltage becomes higher than the first threshold voltage;
a second comparator that outputs the second pulse off signal upon detecting that the winding voltage becomes lower than the second threshold voltage; and
a third comparator that outputs the third pulse off signal upon detecting that a voltage signal corresponding to a current produced by shunting the resonance current becomes lower than a third threshold voltage.

2. The control apparatus according to claim 1, wherein as the feedback voltage increases, the threshold voltage generating circuit reduces another difference between the generated first and second threshold voltages.

3. The control apparatus according to claim 1, wherein the control circuit
- receives the first pulse off signal, the second pulse off signal and the third pulse off signal outputted by the off signal generating circuit, and the first pulse on signal outputted by the on signal generating circuit,
- successively generates a first pulse, a second pulse, and a third pulse,
- uses the first pulse and the third pulse as the second control signal, and
- uses the second pulse as the first control signal.

4. The control apparatus according to claim 3, wherein the control circuit
- performs dead time adjustment, so that the first and second switching elements are not on at a same time, after turning off the first pulse and the second pulse, and
- subsequently turns on the second pulse and the third pulse.

5. The control apparatus according to claim 3, wherein the load detecting circuit averages a voltage signal obtained while the control circuit is generating the second pulse and a ground potential obtained while the second pulse is not being generated.

6. The control apparatus according to claim 1, wherein the on signal generating circuit includes:
- a bottom number setting circuit that sets a bottom number of the ringing voltage in accordance with the load signal;
- a count circuit that counts a number of times the winding voltage falls below a zero potential;
- a bottom number comparison circuit that outputs a matching signal upon detecting that the number counted by the count circuit matches the bottom number;
- a delay circuit that delays the matching signal by ¼ of a cycle of the ringing voltage and outputs the delayed matching signal as the first pulse on signal; and
- a flip-flop that enables the count circuit in response to a first input of the third pulse off signal and disables the count circuit in response to a second input of the first pulse on signal outputted by the delay circuit.

7. The control apparatus according to claim 6, wherein larger values of the load signal cause the bottom number set by the bottom number setting circuit to become smaller.

8. The control apparatus according to claim 1, wherein the on signal generating circuit includes:
- a first bottom number setting circuit that sets a first bottom number of the ringing voltage in accordance with the load signal;
- a second bottom number setting circuit that sets a second bottom number of the ringing voltage in accordance with the feedback voltage;
- a bottom number comparator that compares the first bottom number set by the first bottom number setting circuit with the second bottom number set by the second bottom number setting circuit;
- a selector circuit that selects and outputs the first bottom number upon determining, by the bottom number comparator, that the second bottom number is larger than the first bottom number, and selects and outputs the second bottom number upon determining, by the bottom number comparator, that the second bottom number is smaller than the first bottom number;
- a count circuit that counts a number of times the winding voltage falls below a zero potential;
- a bottom number comparison circuit that outputs a matching signal upon detecting that the number counted by the count circuit matches the first bottom number or the second bottom number outputted by the selector circuit;
- a delay circuit that delays the matching signal by ¼ of a cycle of the ringing voltage and outputs the delayed matching signal as the first pulse on signal; and
- a flip-flop that enables the count circuit in response to a first input of the third pulse off signal and disables the count circuit in response to a second input of the first pulse on signal outputted by the delay circuit.

9. The control apparatus according to claim 8, wherein
- larger values of the load signal cause the first bottom number set by the first bottom number setting circuit to become smaller, and
- larger values of the feedback voltage cause the second bottom number set by the second bottom number setting circuit to become smaller.

10. The control apparatus according to claim 1, wherein the burst control is for a load of 10 to 30 W.

11. A control apparatus for controlling a switching power supply including a resonance circuit, the resonance circuit generating a resonance current and a ringing voltage, and including a resonant reactor that has a transformer with an auxiliary winding, a winding voltage being generated by the auxiliary winding, the control apparatus having a burst control mode that repeats a predetermined switching operation, the predetermined switching operation including a switching period and a no switching period, the switching period including a first switching period and a second switching period that are repeated alternately, the first switching period being a first period in which a first switching element of the switching power supply on a high side thereof turns on and a second switching element of the switching power supply on a low side thereof turns off, the second switching period being a second period in which the first switching element on the high side turns off and the second switching element on the low side turns on, the no switching period being a third period during which the first switching element and the second switching element are off, the control apparatus comprising:
- a first no switching period setting circuit that receives a load signal, which is produced by shunting and averaging a resonance current of the resonance circuit, and sets a first no switching period;
- a second no switching period setting circuit that receives a feedback voltage corresponding to a difference between an output voltage of the switching power supply and a target voltage for the output voltage, and sets a second no switching period;
- a comparator that compares the first no switching period with the second no switching period; and
- a selector circuit that selects the first or second no switching period as a selected no switching period for the burst control mode, and selects the second no switching period as the selected no switching period only upon determining by the comparator that the second no switching period is shorter than the first no switching period, wherein
- the second no switching period setting circuit includes a second bottom number setting circuit, which sets a second bottom number of the ringing voltage in accordance with the feedback voltage, the second bottom number corresponding to the second no switching period,
- the control apparatus further includes a counting circuit, which counts a number of times the winding voltage falls below a zero potential, and in response to the number of times reaching another number corresponding to the selected no switching period, the predetermined switching operation resumes.

12. The control apparatus according to claim 11, wherein the burst control is for a load of 10 to 30 W.

13. The control apparatus according to claim 11, wherein the first no switching period setting circuit includes a first bottom number setting circuit, which sets a first bottom number of the ringing voltage in accordance with the load signal, the first bottom number corresponding to the first no switching period.

14. A control apparatus for controlling a switching power supply including a resonance circuit that generates a resonance current and a ringing voltage, the control apparatus having a burst control mode that repeats a predetermined switching operation, the predetermined switching operation including a switching period and a no switching period, the switching period including a first switching period and a second switching period that are repeated alternately, the first switching period being a first period in which a first switching element of the switching power supply on a high side thereof turns on and a second switching element of the switching power supply on a low side thereof turns off, the second switching period being a second period in which the first switching element on the high side turns off and the second switching element on the low side turns on, the no switching period being a third period during which each of the first switching element and the second switching element is off, the control apparatus comprising:

a first no switching period setting circuit that receives a load signal, which is produced by shunting and averaging the resonance current of the resonance circuit, and sets a first no switching period;

a second no switching period setting circuit that receives a feedback voltage corresponding to a difference between an output voltage of the switching power supply and a target voltage for the output voltage, and sets a second no switching period;

a comparator that compares the first no switching period with the second no switching period; and a selector circuit that selects the first or second no switching period as a selected no switching period for the burst control mode, and selects a shortest period in the first or second no switching period according to a comparison result of the comparator, wherein the second no switching period setting circuit includes a second bottom number setting circuit, which sets a second bottom number of the ringing voltage in accordance with the feedback voltage, the second bottom number corresponding to the second no switching period, the control apparatus further includes a counting circuit, which counts a number of times the ringing voltage reaches a bottom potential, and in response to the number of times reaching another number corresponding to the selected no switching period, the predetermined switching operation resumes.

15. The control apparatus according to claim 14, wherein the burst control is for a load of 10 to 30 W.

16. The control apparatus according to claim 14, wherein the first no switching period setting circuit includes a first bottom number setting circuit, which sets a first bottom number of the ringing voltage in accordance with the load signal, the first bottom number corresponding to the first no switching period.

* * * * *